May 29, 1962
E. HOYET ETAL
3,036,410
MANUFACTURE OF PLATE GLASS
Filed Nov. 12, 1958
7 Sheets-Sheet 1
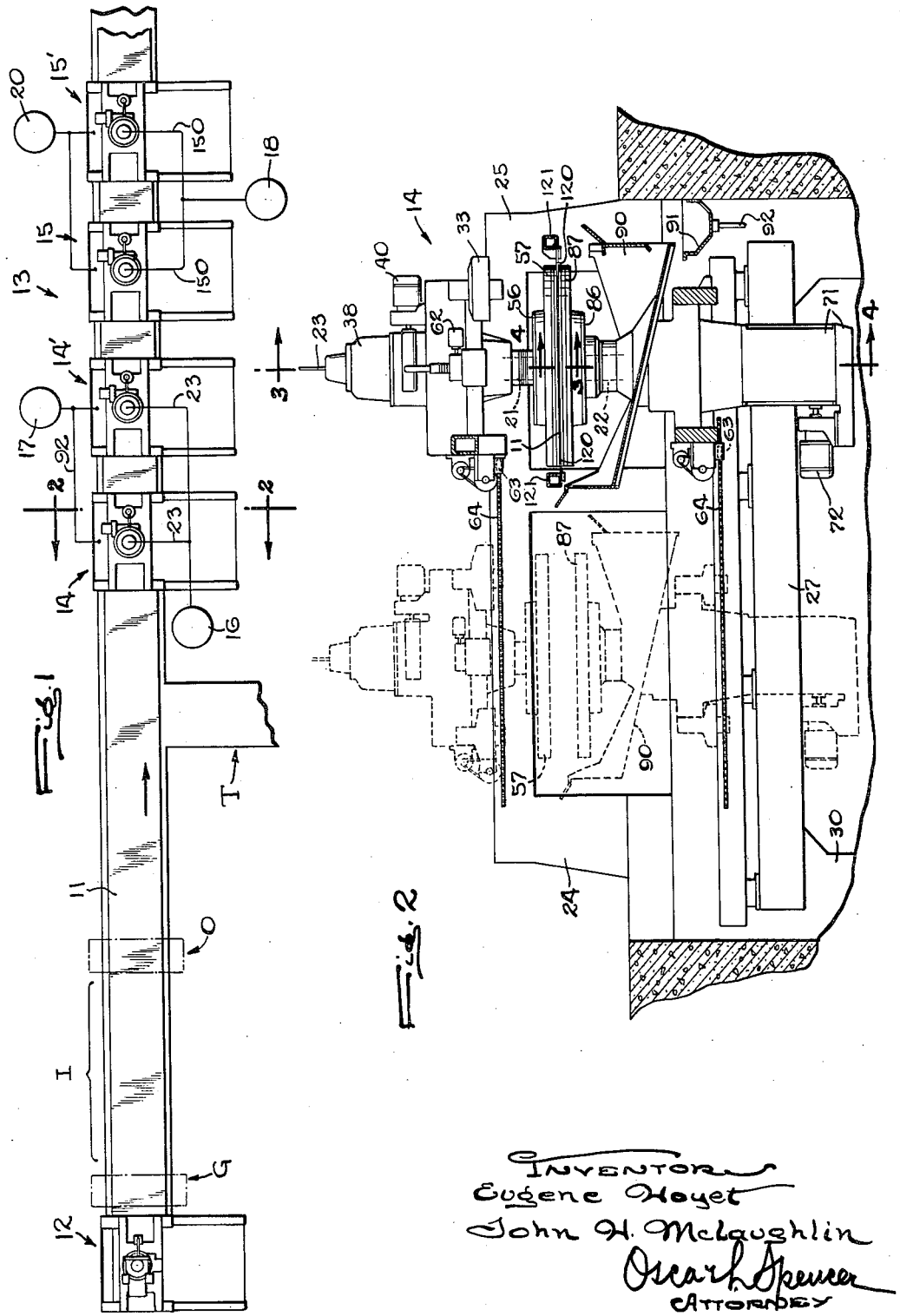
INVENTORS
Eugene Hoyet
John H. McLaughlin
Oscar L. Spencer
ATTORNEY

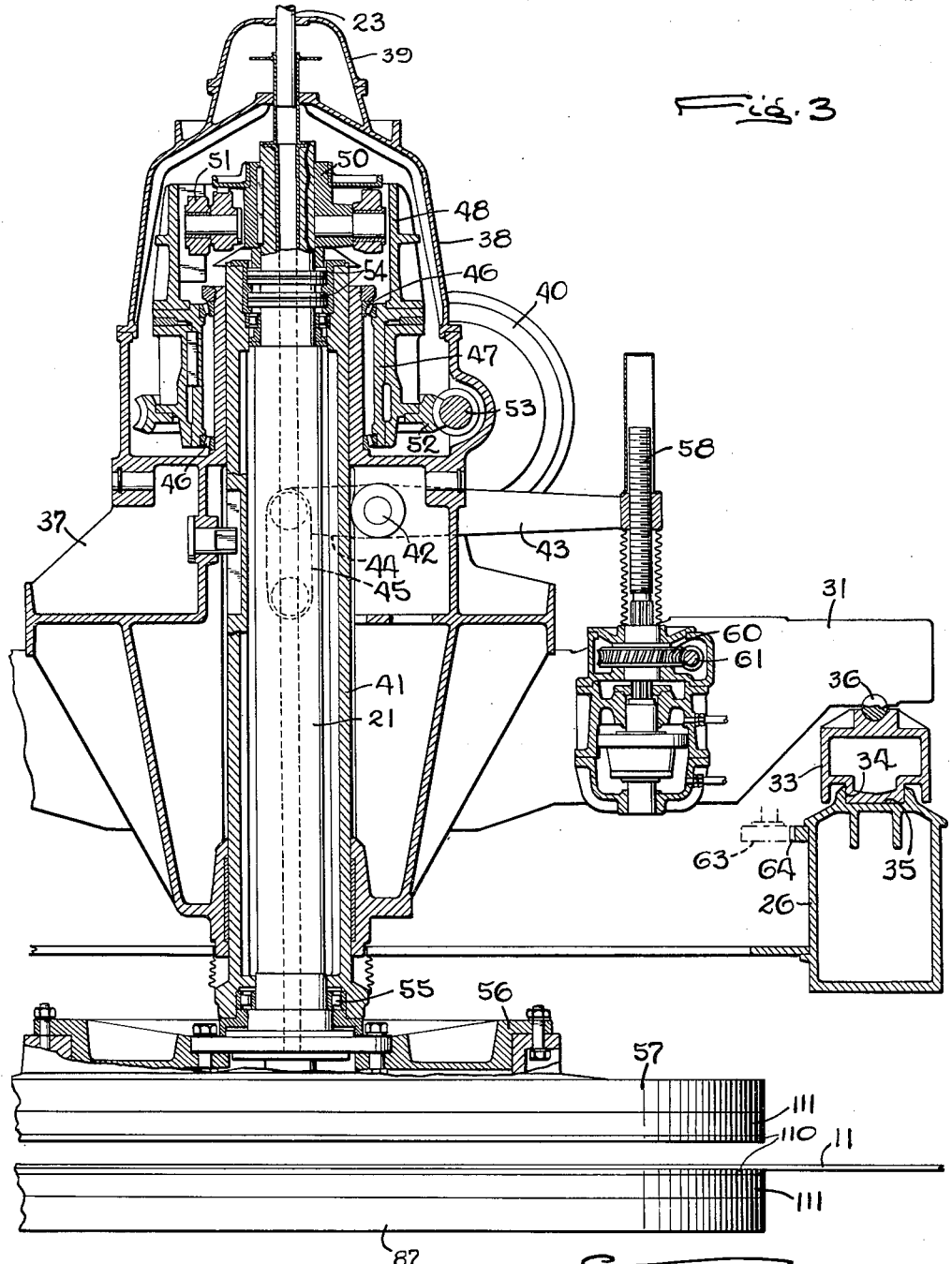

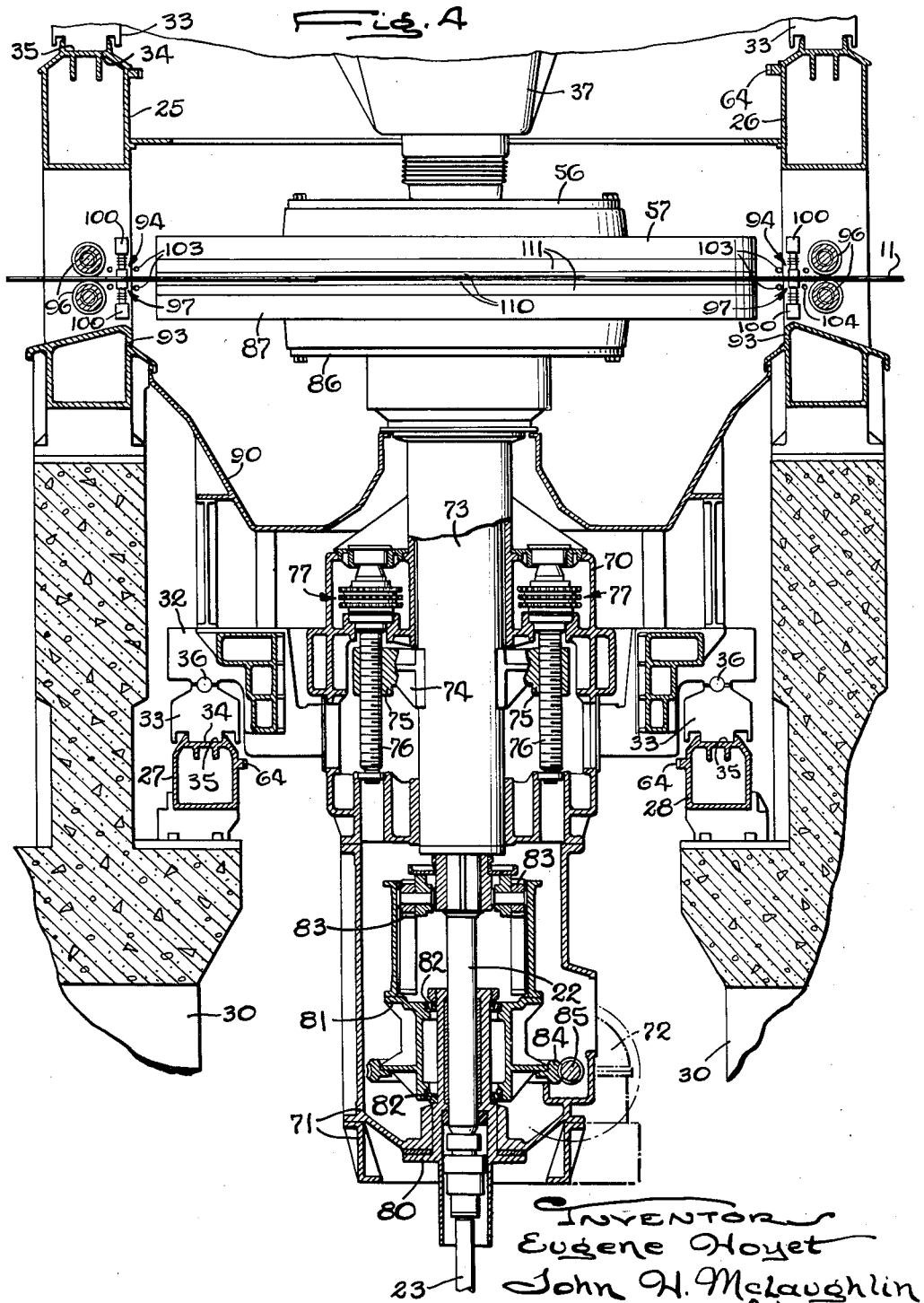

May 29, 1962  E. HOYET ETAL  3,036,410
MANUFACTURE OF PLATE GLASS
Filed Nov. 12, 1958  7 Sheets-Sheet 4
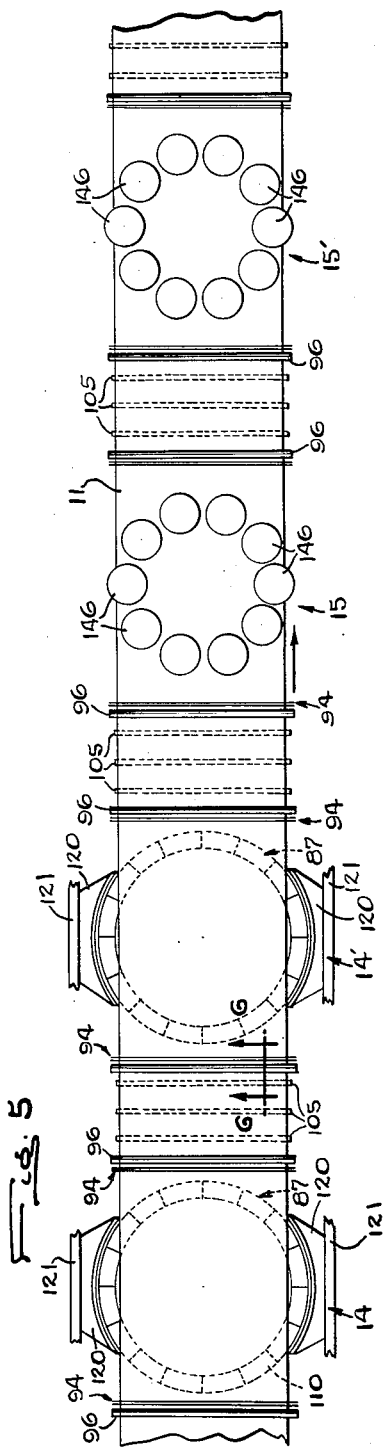
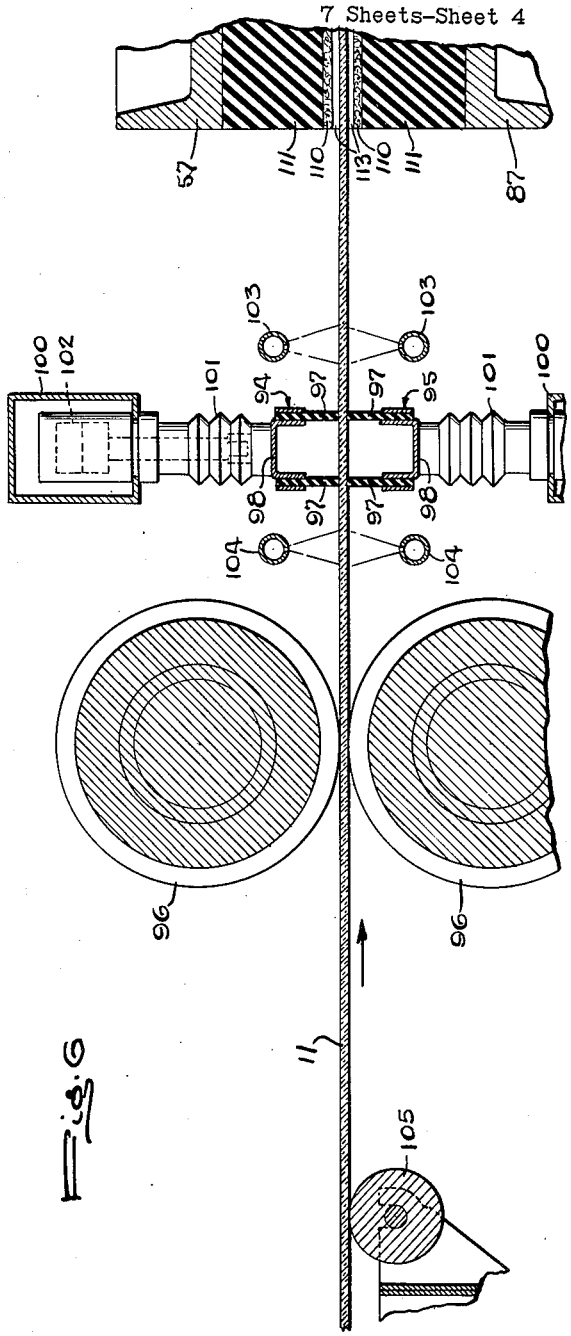
INVENTORS
Eugene Hoyet
John H. McLaughlin
Oscar N. Spencer
ATTORNEY

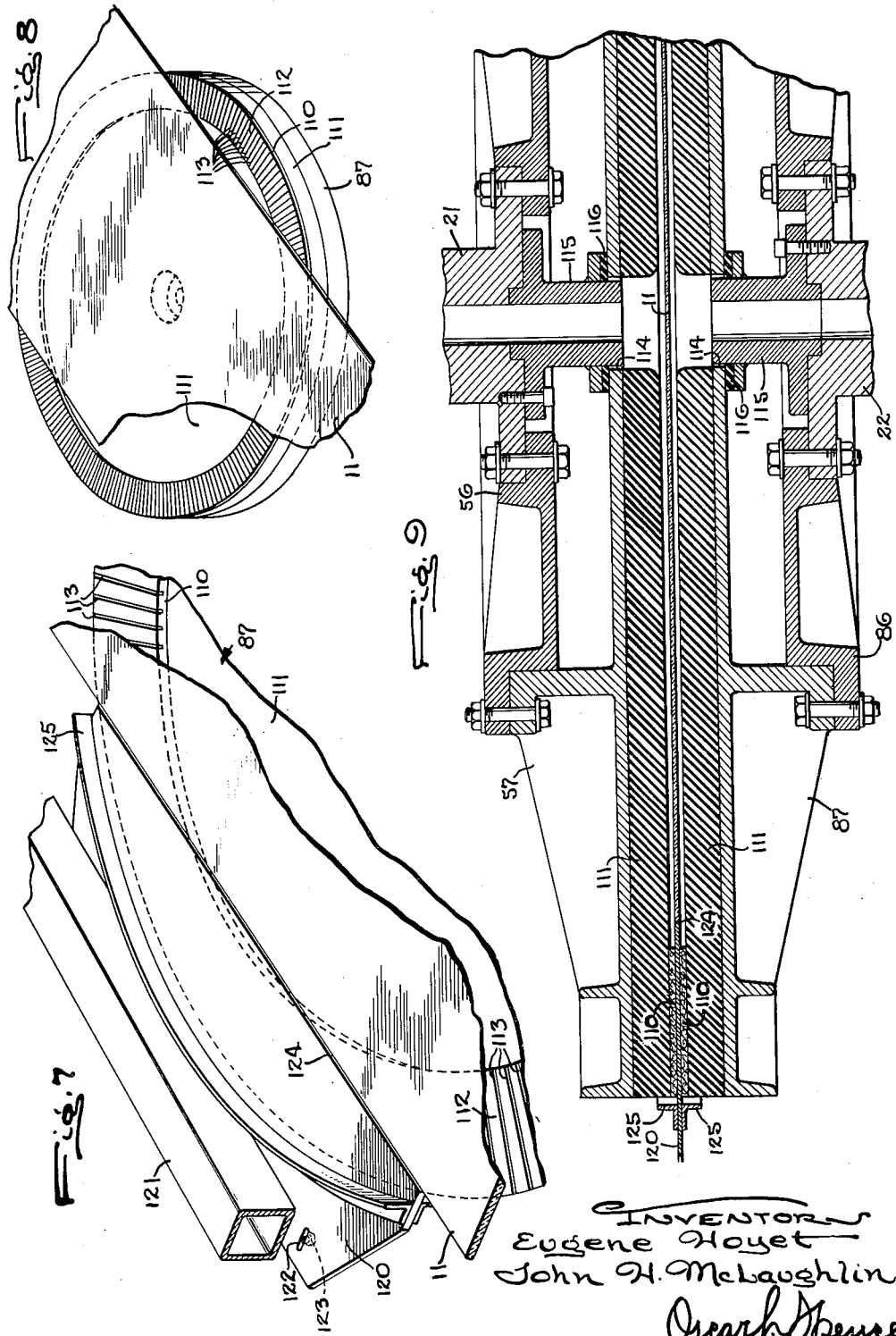

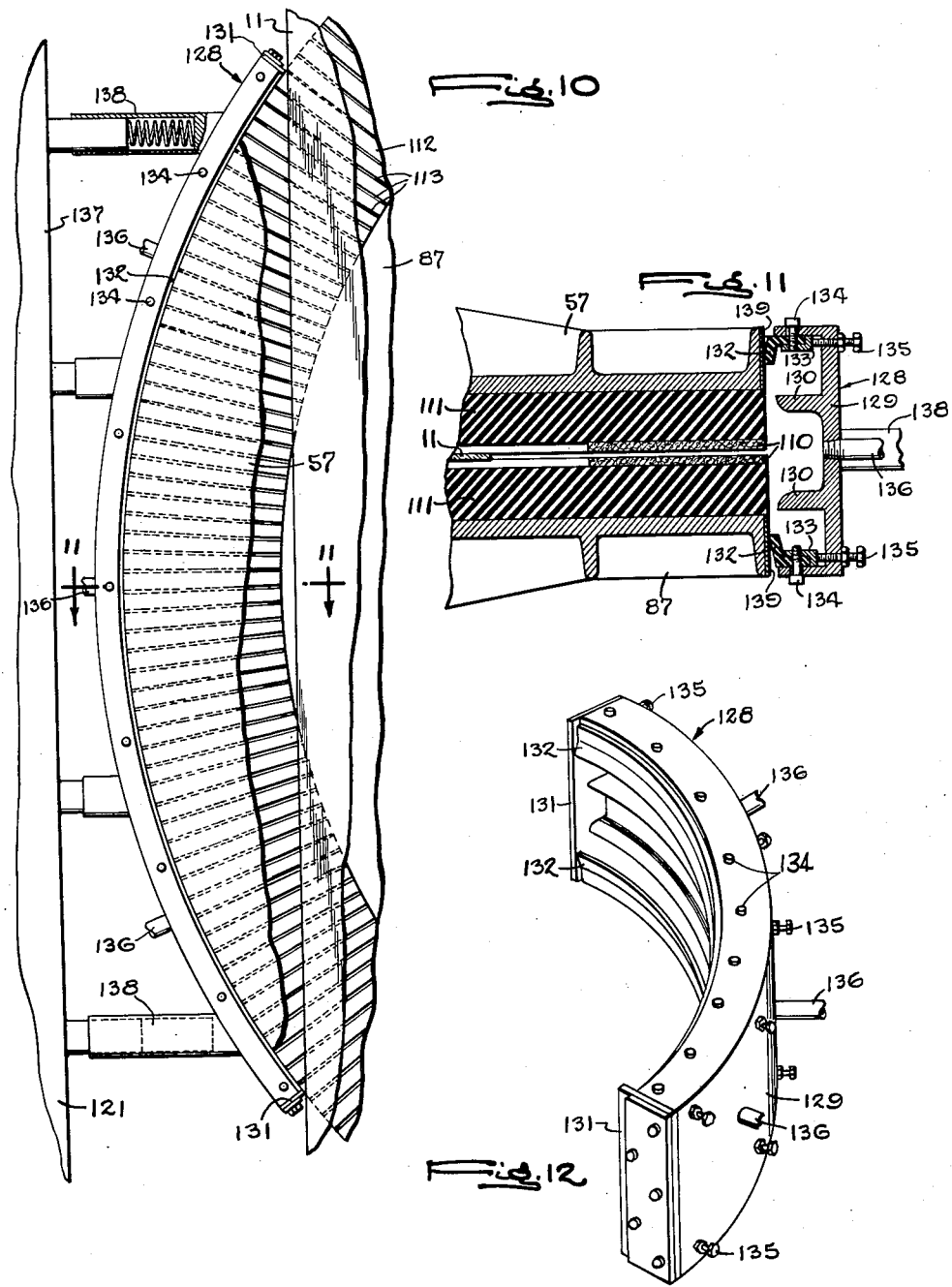

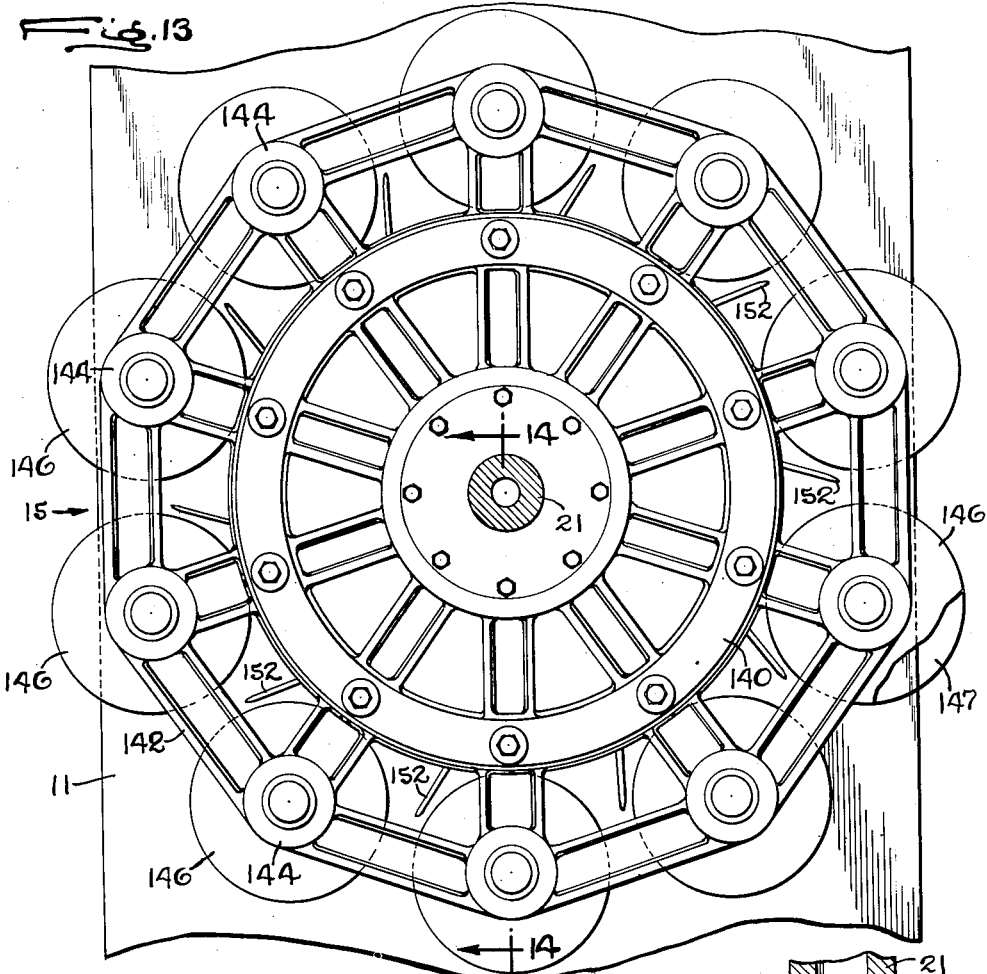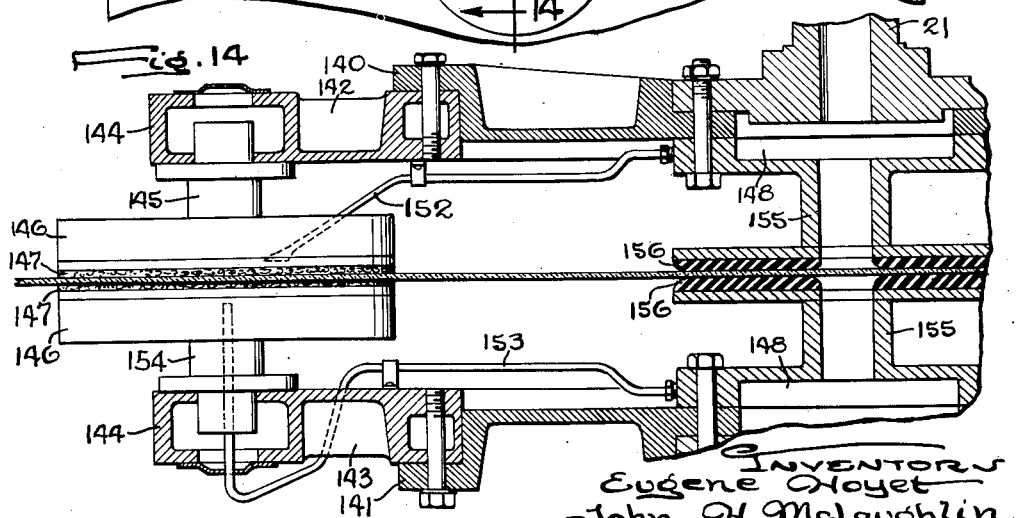

United States Patent Office 3,036,410
Patented May 29, 1962

3,036,410
MANUFACTURE OF PLATE GLASS
Eugene Hoyet, Ford City, and John H. McLaughlin, New Kensington, Pa., assignors to Pittsburgh Plate Glass Company, Allegheny County, Pa.
Filed Nov. 12, 1958, Ser. No. 773,412
7 Claims. (Cl. 51—112)

This invention relates to method and apparatus for twin polishing a continuous plate glass ribbon and, more particularly, for twin polishing ground or prepolished plate glass with chemical solutions containing abrasive.

This application discloses and claims an improvement in the apparatus described and claimed in the application of Albert E. Junge, Serial No. 562,744 filed February 1, 1956, now abandoned; it is further related to the application of Albert E. Junge, Serial No. 773,411, filed November 12, 1958, issued as Patent No. 2,936,555, dated May 17, 1960; and it is furthermore related to the application of David C. Rich, James E. Archer and George R. Harrison, Serial No. 699,281 filed November 27, 1957, issued as Patent No. 2,936,551, dated May 17, 1960.

As is well known in the art, rough plate glass is formed in a continuous ribbon by rolling through a forming machine. The ribbon passing continuously from the forming rolls is cooled and annealed to permit further working. Because the glass so formed has neither parallelism between the ribbon faces nor planarity on either face and because the rolls mark the surface to such a degree that the ribbon is not transparent, the annealed glass is first ground to get the opposite surfaces parallel and then it is polished to further reduce surface imperfections to the point where the quality of the glass surface is good enough to make it saleable as plate glass. The glass emerging from the grinders is referred to as "smoothed." It has an opaque and whitish appearance characteristic of all fine-ground glass.

In the grinding process, major deviations from planarity and parallelism are eliminated, but new defects are introduced into the glass in the form of pits, fractures or "spalls." These all scatter light and are thus responsible for the appearance of smoothed glass. The purpose of polishing is to selectively remove glass from the smoothed surface while maintaining its planarity until the pits, fractures and spalls have been reduced in number and dimensions to such degree that, in addition to becoming transparent, the surface approaches optical flatness sufficiently to become saleable as plate glass. The more nearly perfection is attained, the better the quality of the product, the best grades commanding a premium price.

Modern grinding of plate glass is performed by twin grinders which permit production of smoothed glass in a continuous ribbon. Modern polishing methods are directed to finishing the glass without cutting the ribbon, in other words, to twin polishing.

In the application of Albert E. Junge, Serial No. 562,744, now abandoned and in the previously mentioned Junge Patent No. 2,936,555, there are described and claimed certain novel chemical solutions particularly adapted to the polishing of ground plate glass surfaces with felt polishing pads. In the preferred embodiments of the process and apparatus described in the aforesaid Junge application, a continuous ground plate glass ribbon is twin polished by application of abrasive-containing chemical solutions to both major glass surfaces and the rubbing of such surfaces in the presence of such solutions simultaneously with a number of rotary runners having felt-faced pads, the diameter of each pad face being considerably smaller than the width of the glass ribbon being polished.

The present invention constitutes an improved apparatus for performing the Junge twin polishing process including the provision of mechanical polishing mechanism somewhat more simplified in design and less sensitive to close mechanical tolerances.

In the generic sense this invention is also related to the above-identified patent of Rich, Archer and Harrison in that the present invention utilizes a principle therein disclosed of subjecting a moving continuous ribbon of glass to the action of a polishing composition in conjunction with opposed pairs of polishing pads moving substantially transversely of the path of ribbon movement uninterruptedly across the entire width of the ribbon.

The mechanism of the present invention combines most of the useful attributes of each of the related applications heretofore identified and incorporates few, if any, of their limitations.

These and other advantages of the invention will be more readily understood by reference to the following description and the accompanying drawings wherein exemplary embodiments of the invention are illustrated.

In the drawings:

FIG. 1 is a plan view of a portion of a continuous plate glass factory operation showing a polishing section incorporating the present invention in relationship to the last stage of the grinding section;

FIG. 2 is a view of one twin chemical polishing unit partly in section and partly in elevation taken along the line 2—2 of FIG. 1 and further illustrating in dotted lines the positioning of the unit when withdrawn from the line for maintenance;

FIG. 3 is a sectional view taken along line 3—3 of FIG. 2 illustrating the upper spindle assembly, its association with the supporting ways and the mechanism for controlling the raising and lowering of the upper runner;

FIG. 4 is a view partly in section along the line 4—4 of FIG. 2 and partly in elevation, illustrating in particular the arrangement of the lower runner or the supporting ways, the arrangement of the catch pans for removal of excess chemical polishing slurry and the mechanism for adjusting the lower runner in a vertical position;

FIG. 5 is a diagrammatic plan view of the polishing section shown in FIG. 1 illustrating the relative positions of a two-stage chemical polishing section in accordance with the invention and a post polishing section consisting of two units of more or less conventional design for rouge post polishing;

FIG. 6 is a sectional view taken along the line 6—6 of FIG. 5 showing the pinch rolls, the squeegee mechanism and the chemical and water feed pipes;

FIG. 7 is a perspective view showing the relationship of one of the fluid-retaining plates to the margin of the glass ribbon and an overhanging lower ring runner;

FIG. 8 is an idealized perspective view showing only the lower runner in operating position with respect to the glass ribbon;

FIG. 9 is a sectional view illustrating the relationship of the upper and lower runners in working position with reference to the glass, the fluid retaining plate at one margin and the fluid feed arrangement, and also illustrating the particulars of the runner design with reference to attachment of the felt polishing ring to the driving spindle through a spider, a runner and resilient backing;

FIG. 10 is a plan view of an alternative fluid retention mechanism incorporating supplemental means to feed chemical slurry from the margins of the opposed runner inward;

FIG. 11 is a sectional view taken along the lines 11—11 on FIG. 10;

FIG. 12 is a perspective of the device shown in FIGS. 10 and 11;

FIG. 13 is a plan view of the runner assembly of the post polisher mechanism; and FIG. 14 is a sectional view taken along the lines 14—14 of FIG. 13 showing the corresponding elements of the lower runner on the twin rouge polishing mechanism and particularly illustrating the rouge feeding arrangements.

In the schematic plan view of FIG. 1 there is illustrated part of a continuous plate glass factory line illustrating principally the location of the installation of polishing apparatus in accordance with this invention. As shown, a continuous ribbon of plate glass 11 leaves the last stage grinders of a twin grinding installation, generally indicated at 12, as a commercial smooth. The ribbon 11 traverses a guillotine, generally indicated at G, an inspection area I and a cut-off mechanism O. The guillotine is used to fracture the ribbon at such times as the glass proceeding from the grinders is damaged and unfit for further use. The cut-off mechanism is used principally for severing the glass ribbon when it is desired to utilize the plate glass in the form of a smooth without further polishing. In such instances the glass is conveyed away from the manufacturing line by the transfer conveyor T. In the manufacture of polished plate glass, however, the ground glass ribbon 11 proceeds from the grinders 12 without breaking or severing directly to the polishing section indicated generally at 13. In the embodiment illustrated, the polishing section consists of two chemical twin polishers 14 and 14' arranged in tandem and each constructed in accordance with the invention. Following the chemical polishers are two twin rouge polishers indicated at 15 and 15'. A suitable chemical polishing slurry is fed to the chemical polishers 14 and 14' from a supply tank 16 and is removed from the line through channels hereinafter described to a reservoir 17. Rouge to supply the rouge polishers is provided from storage tank 18 and surplus rouge is drained into tank 20. The grinders 12, chemical polishers 14 and 14' and the rouge post polishers 15 and 15' are all constructed and arranged in bays and are disposed on later to be described ways so as to be removable from the line for maintenance and repair.

Each of the chemical polishing stations 14 and 14' embodies a twin polishing unit shown in considerably more detail in FIGS. 2, 3 and 4. Each unit embodies an upper main hollow spindle 21 and lower main hollow spindle 22, each connected to a source of chemical solution under pressure through feed pipes 23. Each twin polishing unit is supported by a bridge 24 having a pair of spaced upper beams 25, 26 and a like pair of lower bridge beams 27 and 28 spanning the path of the glass ribbon. The cross beams are in turn supported by vertical pillars 30 aligned at uniform intervals along the glass path at such a distance as to span both the path of the glass ribbon and the adjacent maintenance areas.

The entire upper spindle assembly is carried by a cradle 31 and the entire lower assembly by a cradle 32. Cradle shoes 33 with machined surfaces 34 support the cradles in free sliding engagement on the machined bridgeways 35. Cylindrical members 36 interposed between the cradle 31 and the shoes 33 insure proper engagement of surfaces 34 and bridgeways 35 regardless of slight misalignment of the cradle and shoes. Connected for vertical adjustment to the upper cradle 31 and supported thereby is a main upper housing 37, spindle cover 38 and cap 39. The cradle 31 also supports an upper spindle drive motor 40. The main housing 37 carries a spindle housing 41 through a vertically adjustable linkage consisting of a main cross pin 42, a vertical adjusting arm or lever 43, toggle 44 and yoke 45. Spindle housing 41 is restrained against rotation by means of a retainer carried by housing 37 engaging a vertically elongated slot machined in the housing 41. This construction allows vertical movement of the housing 41 relative to the housing 37. Rotatably mounted on tapered bearings 46 is a rotating cage 47 carrying a splined bell member 48 in driving engagement with a shaft head 50 through vertically movable rollers 51 journaled to the shaft head. Worm wheel gear 52 fixed to the cage 47 serves to drive the shaft head by worm 53 on the shaft of the spindle drive motor 40. Shaft head 50 is keyed to the rotatable main spindle 21 which in turn is journaled in the spindle housing 41 at an upper thrust bearing 54 and a lower sealed bearing 55.

Carried by a flange on the main spindle 21 is the upper runner spider 56 to which is bolted the upper runner head or block 57. A raising and lowering screw 58 driven by gear 60 is rotatably mounted on one arm of cradle 31 in driving engagement with one arm of lever 43. In turn, gear 60 is driven by worm 61 on the drive shaft of a motor 62. A motor driven pinion 63 cooperating with rack 64 is used to drive the entire assembly along the ways 35 is removing the assembly to the nonoperating position in the maintenance area of the bay.

Fixed with respect to the lower cradle 32 and supported thereby is a main lower housing 70 and cover 71. A lower spindle drive motor 72 is supported from the cover 71. The lower main housing 70 carries a lower spindle housing 73 on a vertically adjustable support consisting of a supporting yoke 74, threaded arms 75 and driven supporting screws 76 which in turn are journaled in the main lower housing 70 in vertical alignment. Sprockets 77 on the driven supporting screws 76 are inter-connected by a chain drive which is in turn driven by a motor driven worm and gear arrangement (not shown). This raising and lowering arrangement also prevents rotation of the lower spindle housing 73. The lower main spindle 22 near its lower extremity is journaled in a sealed bushing 80 fixed in the main housing cover 71. Rotatably mounted with respect to the outer circumference of bushing 80 is a lower cage 81 riding on tapered roller bearings 82. In function and design quite similar to the upper cage 47, the lower cage 81 drives the lower spindle through splined rollers 83. Worm wheel gear 84 fixed to the lower cage 81 serves to drive the lower cage and spindle by worm 85 on the shaft of the lower drive motor 72.

The lower main spindle 22 is carried by and rotatably supported within the spindle housing 73 in generally the same manner as illustrated with respect to the upper spindle and housing, moving up and down therewith in response to lifting or lowering through the screws 76. Likewise, the lower spindle carries a lower spider 86, and runner head or block 87 conforming to the upper spider and runner head, 56 and 57, respectively.

The driving arrangement above described is such as to rotate the upper and lower runner heads 57 and 87, respectively, in opposite directions, so that the torque applied to the ribbon by one runner is effectively counterbalanced by the opposite runner.

Associated with the lower spindle assembly and support mechanism is a drainage trough 90 serving to catch the surplus chemical polishing fluid draining from the sheet as hereinafter described. The drainage trough has an inclined base so arranged as to discharge into a removal sump 91 which, in turn, is connected by piping 92 with the chemical removal reservoir 17.

As best shown in FIG. 4, the extremities of the trough 90 which extend in the direction of the path of the ribbon underlie drainage separator members 93. The separator members span the path of the glass ribbon and serve to separate the chemical solution leaving the glass surface from the wash and cooling water applied in adjacent areas, as will be more fully explained in the following text.

To make the necessary separation of wash and cooling water from the chemical solution used to flood the upper and lower surfaces of the glass ribbon, upper and lower squeegee units 94 and 95 are provided on each side of the runners so as to isolate each runner area from the next adjacent area. Pinch rolls 96 support and drive the glass on either side of the polishing station (see especially FIG. 6). Each squeegee unit consists of two rubber lips 97 fastened to a channel member 98 which is carried by a beam 100 through a spring biasing arrangement involving a spring 101 urging the squeegee unit toward the glass surface and a pneumatic piston 102 which can be actuated to lift the squeegee unit from the surface. Each beam 100 is supported in such a manner that it, together with its squeezee unit is movable in a path transverse to that of the glass ribbon, so that each squeegee unit may be removed from the line for maintenance. In the area engaged by the chemical polishing runners between squeegee units the surface of the glass is flooded with chemical solution through manifolds 103 connected to the chemical feed pipes 23 and on the opposite sides of each squeegee the glass surface is washed and cooled with water supplied through similar manifolds 104.

Reverting to FIG. 4, the drainage separators 93 are disposed so that the apex or dividing line of their structure is in register with the center of a squeegee unit immediately above it. Excess wash and cooling water flowing away from the chemical recovery trough 90, because of the disposition of its apex, is discharged to a sump in the base of the polishing bay and is not mixed with the chemical polishing slurry flowing into the recovery trough 93.

As shown in FIGS. 1, 5 and 6, each polishing station is defined by a pair of pinch rolls 96 and a pair of squeegee units on each side of the twin runner unit. Each polishing station is separated from the next adjacent polishing station a considerable distance to permit inspection of the glass ribbon and afford time for the glass to cool. In the span between individual polishing stations the glass is supported on conveyor rolls 105 of conventional construction.

The opposed runners of each chemical polishing unit are each provided with a felt facing 110 in the form of a ring or annulus and of such dimensions that both the inner and outer margins of the ring extend over the edge extremities of the glass ribbon 11. The ring-shaped felt facing 110 is centered in alignment with the center of the runner and spindle. The back of the felt facing 110 is attached to the runner head through a resilient backing member 111 formed of sponge rubber or other suitable elastomer, the backing member having a central opening therethrough. The surface 112 of the ring which makes rubbing contact with the glass is provided with a plurality of radial grooves 113 for the purpose of fluid distribution and supply.

In terms of dimensions applicable to the polishing of a glass ribbon 127 inches wide, the felt rings may suitably be of 140-inch inner diameter, 160-inch outer diameter and ½-inch in thickness. The radial grooves 113 may suitably be ¼-inch deep, ³⁄₁₆-inch wide and on centers ¾-inch apart at the outer margin of the felt. If constructed of foam rubber, the resilient backing member may be suitably about three inches in thickness. Increasing the thickness affords additional resiliency, but tends to diminish the stability of the polishing system. The backing member 111 may be attached to the runner head with a suitable adhesive resistant to chemicals and the felt 110 is attached to the backing 111 in like manner.

With particular reference to FIG. 9, each ring-faced runner is provided with central fluid supply through the main spindle and a central runner opening 114 to create a fluid-tight connection. The hollow core of main spindle 21 or 22 is connected to the runner 57 or 87 by a flanged cylindrical extension 115 faced with a washer of sponge rubber 116 or other fluid resistant compressible material, so that when the runner head is connected to the spider the washer is placed under compression. The flanged extension 115 extends into the opening 114 and terminates flush with the runner head. Ingress of the fluid to the space between the resilient backing 111 and the glass surface being polished is thus provided through the cylindrical extension 115 and the central opening in the backing member 111. The edge of the central opening in the backing member 111 is rounded for purposes discussed below.

In order to control the flow and distribution of fluid from the supply area in the center of the runners, fluid retaining mechanism is provided. According to one embodiment of the invention, illustrated by FIGS. 7 and 9, the fluid retaining mechanism is in the form of a plate 120 adjustably supported on a supporting channel 121 by means of slots 122 and screws 123 permitting adjustment toward and away from the edges of the glass ribbon 11. There are two plates 120 at each polishing station, one on each edge of the glass ribbon 11. Each is so constructed and arranged that its inner margin 124 extends between the felts 110 at their widest extremity to a position as close as possible to the edge of the glass ribbon without touching the glass. In lengthwise extent, each plate 120 is of such length as to bridge the entire overhang of the upper and lower runners along the glass path.

Extending upwardly and downwardly on each side of plate 120 is a splash shield 125 of arcuate shape and of a radius slightly in excess of the radius of the runner. If desired, the splash shield 125 may be formed integrally with the plate 20. Alternatively, as illustrated it may be constructed of such material and so attached as to increase the dimensional stability of the plate 120 on which it is mounted.

In an alternative embodiment of the invention best illustrated in FIGS. 10 and 11 and 12, the fluid retaining mechanism may take the form of arcuate fluid retaining members indicated generally at 128. As shown, each fluid retaining mechanism 128 comprises a rigid arcuate member 129 of channel shape in cross-section reinforced with flanges 130 and so constructed that its inner diameter is of a radius slightly in excess of that of the perimeter of the runner. The length of the inner arc on the retaining member 128 is such that it terminates just short of the margin of the ribbon when brought into juxtaposition with the ring runner. To form a fluid seal, the terminal ends of the arcuate member 129 are provided with end sealing members 131 held by retainers against the ends of the member 129. Upper and lower sealing members 132 are adjustably supported at the inner extremity of the fluid retaining member as, for example, by angles 133 and screws 134 and 135. Sealing members 131 and 132 are suitably formed from an elastic acid-resistant material such as rubber or other suitable elastomer. Adjustment is made so that when the fluid retaining member is urged against the outer margin of the runners with a light compressive force, sealing members 131 and 132 are in resilient sliding engagement therewith. In the construction shown, fluid forces exerted within the chamber formed by the retaining member 128 act to maintain the sealing members 131 and 132 in sealing contact with the periphery of the ring runners. A plurality of feed pipes 136, connected to source 23 of chemical polishing fluid, discharge internally within the arcuate fluid retaining member. The flow of fluid to the retaining member can be controlled so as to achieve one of three alternative objectives. If desired, the flow can be so limited as to merely throttle the discharge of chemical fluid in the overhang area below that amount of flow which would issue from the runners in the absence of the retaining member. Alternatively, the flow into the retaining member can be increased to the point where it exactly counterbalances the discharge flow which would otherwise take place at the overhang. Finally, if desired, the flow of fluid to the retaining member can be increased to such degree that the direction of flow in the overhang area is reversed; that is to say, edge feeding takes place. In the showing of FIG. 10, the fluid retaining member 128 is mounted on a supporting member 137 through spring biased arms 138 acting to urge the retaining member against the outer margin of the runner with a slight yielding pressure. Advantageously each runner head periphery can be faced with a material selected for its low resistance to friction and high resistance to chemical attack as at 139.

In FIGS. 13 and 14 there are illustrated upper and lower runner and feed assemblies suitable for use in the rouge post polishers at stations 15 and 15'. The construction of the support, spindle, drive and fluid removal elements used in rouge post polishing is in all respects identical with that described in connection with the chemical ring runners and will not be further described here.

Bolted to the terminal flanges on the upper and lower hollow main spindles are upper and lower polishing heads 140, 141 of cast open-work construction. Mounted on heads 140, 141 are upper and lower spiders 142, 143 each consisting of a web like structure accommodating a plurality of journal housings 144. Journaled for free rotation on stub shafts 145 within housings 144 are a plurality of round runner blocks 146, each faced with a felt rouge polishing pad 147. Both the upper and lower runner assemblies are provided with a central rouge reservoir 148 supplied through the hollow main spindles from the rouge supply feed lines 150 (see FIG. 1).

In one arrangement of rouge feeding shown in conjunction with the upper runner of FIGS. 13 and 14, rouge is fed to the surface of the glass at a position in advance of each runner face through the medium of a plurality of rouge applicators 152 connected to reservoir 148. Rouge applicators 152 take the form of supply pipes or hoses provided with a somewhat flattened discharge end. In an alternative arrangement shown in conjunction with the lower runner in FIG. 14, rouge is supplied to the center of each rouge polishing block through conduits 153 connected to reservoir 148 at one end and to hollow stub shafts 154 at the other.

To support the glass at the section intermediate the span between the runner blocks 146 each runner is provided with a hollow flanged central support 155, faced with sponge rubber 156 or other resilient soft material and opening into reservoir 148 so as to supply rouge to the sponge rubber facing 156. The edges of the sponge rubber 156 facing are rounded, for a purpose to be described below.

Each lower spindle assembly for each of the chemical and rouge polishers is operatively connected with a set of retractable rolls mounted on a lazy tong arrangement, so that when the lower unit is withdrawn to the maintenance bay, the rollers act to support the glass.

With the lower runners in operating position along the line and so adjusted vertically as to maintain the desired plane of travel of the ribbon in conformity with the conveyor system, the squeeges 94 and 95 are moved into operating position in engagement with the glass and the feed of chemical slurry and wash water is initiated through the manifolds 103 and 104 to both surfaces of the sheet. The upper runner of first station 14 is then lowered by means of the raising and lowering screw 58 until the surface 112 of the felt ring just makes contact with the moving ribbon of glass. Then, the central feed of chemical fluid is initiated through the upper and lower hollow spindles 21 and 22 and the runner drive motors are started to rotate the upper and lower heads in opposite directions. With the runners in rotation, the upper runner is further lowered until the desired loading is accomplished as determined by the kilowatt consumption of the drive motors. These operations are then repeated sequentially in stations 14', 15 and 15' until all the polishing sections are operating on the moving ribbon in sequence.

In an exemplary operation of twin ring runners of 160- inch outside diameter and 140-inch inside diameter of the felt rings while operating on a smoothed glass ribbon 127 inches wide travelling at a rate of 175 inches per minute, spindle drive motors of 150 horsepower are utilized. Fluid in addition to that fed through manifolds 103 is fed centrally through the upper and lower runners at a nominal rate of 75 gallons per minute. Because the supply of chemical slurry through manifolds 103 is not relied upon to feed the chemical beneath the felt faces of the ring runners, the rate of feed of chemical slurry through manifolds 103 is not at all critical, the only criterion being that the supply should be adequate to keep the entire surface of the glass wet with fresh solution between the squeegees defining each chemical polishing station and thus to avoid nonhomogeneous dwell of the active solution on the surface. However, the central feed of chemical slurry to the spindles 21 and 22 is interrelated with the velocity of the felts on the runners and the pressure. Thus, at the feed rate above indicated, and with the runner speeds regulated at 25 r.p.m. the runner loading is compensated until the gage pressure of the feed to each runner is between two and four pounds per square inch while the kilowatt loading on each runner motor is between 100 and 125 kw. The particular chemical polishing slurry utilized under such conditions is made up of the following ingredients in the following proportions by weight:

| | Parts |
|---|---|
| Hydrogen fluoride (HF) | 5 |
| Potassium bifluoride (KFHF) | 45 |
| Water ($H_2O$) | 140 |
| Sugar (sucrose) | 140 |

Suspended in the solution formed of the above ingredients are finely divided particles of chromic oxide ($Cr_2O_3$) in the amount of 1% by weight of the solution. The average ultimate particle size diameter is 0.3 micron.

This chemical slurry does not form part of the instant invention being one of the compositions described and claimed in the previously mentioned Junge Patent No. 2,936,555. The permissible variations in the constituency of such composition as related to felt polishing of plate glass are fully set forth in such application, to which reference is made, but such modifications of the composition described are not requisite to the utilization of the invention here claimed.

Both the slurry fed to the glass surface through the manifolds and that fed to the spindles is adjusted to a temperature in the vicinity of 115 to 120 degrees F. to avoid fracturing the glass. The cooling and wash water is similarly tempered.

The span of the ribbon 11 between opposite extremities of the felt ring 110 of the lower runner is ordinarily supported by fluid flowing from the opening in the backing member outwardly into the cavity defined by ring 110 and then through the grooves 113 in the felt face 112. In a similar manner, the ribbon is prevented from substantial upward deflection from its normal plane by the fluid flowing in the corresponding upper cavity. If momentary deflection of the ribbon is sufficient to bring it in contact with either resilient backing member, marring of the glass surface is avoided by the rounded contours of the opening in the backing member and by the flooding of the backing surfaces with fluid to such degree that friction does not rupture the film formed by the chemical solution on the glass surface.

In the exemplary operation being described, the particular fluid-retaining member utilized is the plate 120 illustrated in FIG. 7. The thickness of the plate member 120 is selected on the basis of the thickness of the glass being manufactured at a given time and is a few thousandths of an inch thinner than the minimum actual thickness experienced in the manufacturing operation. The plate can be constructed of corrosion-resistant metal with polished faces. Advantageously, the metal plate may be faced with a thin smooth coating of tetrafluoroethylene, such as that commercially available under the trade name "Teflon." Tetrafluoroethylene has a high degree of resistance to attack of the chemicals used in this operation and also has a relatively low coefficient of friction when rubbed with the felts in the presence of the abrasive solution. The margin 124 of the plate 120 should be slightly rounded or beveled to avoid scraping of the felts in their passage over the plate.

In function, the plates 120 act in a two-fold capacity. Primarily, they serve as extensions of the glass ribbon in maintaining a uniform distribution and flow of the chemical slurry as it proceeds from the central feeding zone through the grooves 113 to be discharged at the periphery of the rings. In the absence of the plates or equivalent fluid retaining members, the restriction to flow of the fluid which occurs at the areas where the rings are in contact with glass would be relieved at the marginal edges of the glass where the runners overhang. This would occasion a non-uniform flow pattern, uneven distribution and loss of support of the glass on the underside. A secondary function of the plates 120 is to maintain planar stability of the runner faces. The plates act to maintain parallelism and separation of the felt faces 112 in the area of the overhang. Alternate expansion and compression (pulsing) of the felts due to alternate relief and loading is avoided. Thus, undesirable variations in the degree of mechanical working are overcome. Scraping of the felts on the edges of the glass is minimized. The splash shields 125 serve to protect persons and machinery from discharging chemical slurry and act to direct such discharge to the recovery system.

The functions of the alternative fluid retaining member 128 shown in FIGS. 10, 11 and 12 are similar to those of plates 120, the only difference being that in the alternative form separation of the felts is obtained by the exertion of fluid rather than mechanical counter forces and the restriction to excessive flow in the overhanging arc is obtained by a fluid rather than a mechanical dam. In addition, the arrangement of the member 128 permits counter-current edge feeding of the felt rings when desired.

In the foregoing description of polishing runners, the material used to fabricate the surfaces which contact the glass has been referred to as felt for the reason that the most satisfactory polish obtained at present has been that resulting when the rings are constructed of felted animal hair. More specifically, white wool felt of density .55 supplied by American Felt Company at Glenville, Connecticut, as Catalog No. 5332 with minimum water swell is preferred. Because of limitations in the sizes in which this felt can be obtained, the felt rings are fabricated in segments.

Foam rubber 2115 obtained from Shields Rubber Company of Pittsburgh, Pennsylvania, is a suitable resilient foam for utilization in fabricating the backing member 111.

In the exemplary operation above described the chemical slurry employed and the operating conditions have been selected with a view of producing the best quality glass obtainable: "silvering" quality. Under optimum conditions, the polished glass emerging from the second chemical ring runner unit is of the best quality. However, complete control of the process variables is difficult and sometimes the glass emerging from the second chemical polishing station is superficially marred by chemical haze or stain. Likewise, when operating under less than optimum conditions a light "sweep" defect may persist after the glass has emerged from the second chemical polishing station. Sweep is a term applied to a discernible pattern in which the path of the felts which rub the glass is observable.

In order to insure elimination of even the slightest defect it is desirable to provide for some post polishing with rouge and in order to maintain all the advantages of continuous twin operation until the ribbon is completely polished it is desirable to provide twin post polishers in the polishing section.

As shown, two post polishing stations are provided in tandem on the line following the second chemical polisher station. When inspection of the washed glass emerging from the chemical polishers indicates persistence of haze, stain or sweep, either or both of the post polishing units may be brought into service.

The operating conditions of the post polishers are those conventional in rouge polishing. In particular, the conventional spider runner arrangement of a plurality of round runner blocks of diameter much less than the width of the glass ribbon arranged in a ring around the spindle and journaled in the runner head for free rotation is desirable. Upper and lower runners are of the same dimensions and are rotated in opposite directions. The work pattern of these freely rotating blocks acting on the glass surface is very different from the work pattern of the ring runners, a fact which markedly assists in the removal of any sweep left by the chemical polishers.

The driving assembly and sequence of operations in initiating the twin rouge post polishers is like that described with respect to the chemical twin ring runners and will not be repeated here. However, it should be pointed out that the central feed of rouge slurry to the rouge runners is not supplemented by flooding the surface of the glass through outside manifolds, nor is the flow rate of rouge anything like the rate of chemical slurry supplied to the ring. Specifically, the felts in the rouge post polishers are run rather dry and a relatively dense rouge is employed. The rouge slurry under gage pressure between 2–4 pounds per square inch is fed centrally through the upper and lower hollow drive spindles into the reservoir 148 in the runner head. This pressure is exerted on the upper and lower surfaces of the glass at the center of the runners through the openings in the central supports 155 and acts to support the glass intermediate the span of the polishing blocks. The rouge under pressure flows out slowly in a radial direction from the opening and acts to "flood out" or lubricate the sponge rubber facing 156 so that the glass is not marred thereby. The rounded contours of the rubber facing 156 also avoid marring of the glass. Feed of rouge to the runner blocks through the supply pipes 152 and 153 is controlled so that the "pull" on the drive motors is between 100 to 125 kw. at 25 r.p.m.

It will be appreciated that the compressible resilient backing on the polishing runners affords some degree of tolerance for mechanical variations from precise circular symmetry and planeness in the runner head and felt face 112 which would otherwise defeat the obtension of the surface quality desired. Nevertheless, the angular deviations from the vertical in the spindle should be controlled within limits such that the deviation of any portion of the runner face from a reference plane is not more than 0.050 inch.

Obviously, there is some degree of lattitude in the operating conditions above stated. In general, the relationship of the chemical slurry feed rate to the runner velocity and pressure is such that for a given quality standard an increase in speed or loading (pressure) of the runners should be accompanied by an increase in the rate of feed. The feed rate must be maintained to a degree adequate to limit the frictional drag and accompanying temperature rise in the glass. A somewhat arbitrary but safe limit of glass temperature emerging from the runners is 150° F.

Two chemical polishing stations have been specified under the conditions of operation stated above, but the invention is not to be construed as limited thereby. When the speed of travel of the glass ribbon under the runners is reduced, the time of dwell under each polishing head is increased and one unit may suffice, particularly when the quality of finish desired is less than the optimum grade. Conversely, if higher ribbon speeds are utilized supplemental chemical polishing stations can be utilized.

Again, the dimensions and spacing of the feed grooves in the runners have been specified with regard to specific operating conditions and end quality, but considerable variation is permissible in number and configuration. The function of such grooves is to control the rate and distribution of feed to the felt polishing surfaces without creating any defect-producing surfaces. Suffice it to say that in number and configuration the grooves must be such that the feed is maintained evenly, in adequate supply and yet under such control that the felts pull without flooding out.

Fumes emanating from the glass surfaces undergoing chemical treatment are corrosive and obnoxious. Accordingly, they are removed via a hood and evacuation system lined with suitable corrosion resistant materials. Since this equipment may be of conventional design and arrangement, it is not shown in the drawings in the interest of preserving clarity and simplicity.

We claim:

1. In apparatus for twin felt polishing a moving ribbon of plate glass utilizing a polishing medium consisting of a slurry containing suspended abrasive particles, the improvement which comprises a pair of driven, felt-faced ring runners mounted concentrically and adapted to be rotated in opposite directions, means for adjusting the spacing between said runners, means for applying controlled pressure through said runners to the glass ribbon when in operating relationship thereto, said runners being of such dimensions that the inner margin of the annulus of the face of each extends beyond both edge extremities of the glass ribbon, means for supplying slurry under pressure to the glass surfaces enclosed within the rings and fluid retaining means cooperating with the runners at those positions which overhang the glass to diminish the escape of slurry which would otherwise take place between segments of the runner faces not in engagement with the glass ribbon.

2. The apparatus of claim 1 wherein the fluid retaining means constitutes a plate supported externally of the ring runners in a plane approximately that of the ribbon being polished, and being of such dimensions as to substantially bridge the void between runner faces at the location of their overhang.

3. The apparatus of claim 1 wherein the fluid retaining means constitutes a sealing member in fluid retaining engagement with each runner around its periphery for an arc approximately that of the overhang of the outer margin of the annulus of each runner.

4. The apparatus of claim 1 in which one of said ring runners is in supporting relationship to the glass ribbon and the opening defined by the inner margin of the annulus of the felt face of such runner is at least partially filled with a resilient pad adhered to the runner backing and having a face below the plane of the annular felt face.

5. In apparatus for twin felt polishing a horizontally moving ribbon of plate glass utilizing a polishing medium consisting of a slurry containing suspended abrasive particles, the improvement which comprises a pair of driven, felt-faced ring runners mounted concentrically and adapted to be rotated in opposite directions, means for adjusting the spacing between said runners, means for applying controlled pressure through said runners to the glass ribbon when in operating relationship thereto, means enclosing each ring runner including a central backing member positioned adjacent the glass ribbon when in operating relationship thereto, said backing member being apertured to permit the supply of slurry therethrough to the glass, and means for maintaining the slurry pressure between the glass surface and the backing member to provide a fluid support for the ribbon during its horizontal travel within the ring runners.

6. In apparatus for twin felt polishing a horizontally moving ribbon of plate glass utilizing a polishing medium consisting of a slurry containing suspended abrasive particles, the improvement which comprises a pair of driven, felt-faced ring runners mounted concentrically and adapted to be rotated in opposite directions, means for adjusting the spacing between said runners, means for applying controlled pressure through said runners to the glass ribbon when in operating relationship thereto, a resilient backing member within at least the lower one of said ring runners positioned near the plane of the glass ribbon, means for supplying slurry through the backing member for escape along the plane of glass surface to the felt-faced runner, and means for maintaining the slurry pressure between the glass surface and the backing member to define a fluid bed support therebetween and support the ribbon during its travel within the ring.

7. In apparatus for twin felt polishing a horizontally moving ribbon of plate glass utilizing a polishing medium consisting of a slurry containing suspended abrasive particles, the improvement which comprises a pair of driven, felt-faced ring runners mounted concentrically and adapted to be rotated in opposite directions, means for adjusting the spacing between said runners, means for applying controlled pressure through said runners to the glass ribbon when in operating relationship thereto, a sponge rubber backing member on each runner within each felt-faced ring, said runners substantially closing the space between them when the glass ribbon is in operating relationship thereto, each backing member having a central aperture, means for supplying slurry therethrough to the glass surface, and means for maintaining slurry between the backing members and the glass under pressure to provide a fluid bed support for the glass during its travel through the ring.

References Cited in the file of this patent

UNITED STATES PATENTS

| | | |
|---|---|---|
| 817,798 | Peirce | Apr. 17, 1906 |
| 1,964,320 | Griffin | June 26, 1934 |
| 2,285,318 | Waldron | June 2, 1942 |
| 2,630,658 | Golightly | Mar. 10, 1953 |
| 2,664,711 | Howlett | Jan. 5, 1954 |
| 2,673,423 | Hoyet et al. | Mar. 30, 1954 |
| 2,788,619 | Touvay | Apr. 16, 1957 |
| 2,859,565 | Javaux | Nov. 11, 1958 |

UNITED STATES PATENT OFFICE

CERTIFICATE OF CORRECTION

Patent No. 3,036,410                        May 29, 1962

Eugene Hoyet et al.

It is hereby certified that error appears in the above numbered patent requiring correction and that the said Letters Patent should read as corrected below.

Column 4, line 18, for "is" read -- in --; column 7, line 57, for "squeeges" read -- squeegees --; column 8, line 31, for "140" read -- 100 --.

Signed and sealed this 12th day of March 1963.

(SEAL)
Attest:

ESTON G. JOHNSON
Attesting Officer

DAVID L. LADD
Commissioner of Patents